March 14, 1944.   J. F. SWIFT ET AL   2,344,331
FRICTIONAL RESISTANCE TEST APPARATUS
Filed Aug. 22, 1941   3 Sheets-Sheet 1

INVENTOR.
J. FREDERICK SWIFT &
RAYMOND J. MILLER
BY
ATTORNEY

March 14, 1944.   J. F. SWIFT ET AL   2,344,331
FRICTIONAL RESISTANCE TEST APPARATUS
Filed Aug. 22, 1941   3 Sheets-Sheet 2

INVENTOR.
J. FREDERICK SWIFT &
BY RAYMOND J. MILLER
ATTORNEY

Patented Mar. 14, 1944

2,344,331

UNITED STATES PATENT OFFICE

2,344,331

FRICTIONAL RESISTANCE TEST APPARATUS

John Frederick Swift and Raymond J. Miller, Detroit, Mich., assignors to Hydraulic Brake Company, Detroit, Mich., a corporation of California Application August 22, 1941, Serial No. 407,992

4 Claims. (Cl. 265—10)

This invention relates to test apparatus, and more particularly to apparatus for testing the frictional resistance imposed on a mass rotated in fluid.

Broadly the invention comprehends a test apparatus including means for rotating a mass in fluid and to measure the torque due to rotation of the mass, to measure the reaction torque, to indicate the speed of rotation of the mass, to measure the temperature of the fluid due to viscous drag and agitation, and to give indications of these conditions at all speeds of rotation of the mass.

An object of the invention is to provide a test apparatus for measuring friction on an element rotated in fluid.

Another object of the invention is to provide a test apparatus for measuring frictional resistance to rotation of various elements in fluids of various density.

Another object of the invention is to provide a test apparatus for measuring frictional resistance to rotation of an element in fluids of various viscosity and at various speeds of rotation.

Other objects and advantages of the invention will appear from the following description taken in connection with the drawings forming a part of this specification, and in which—

Figure 1:
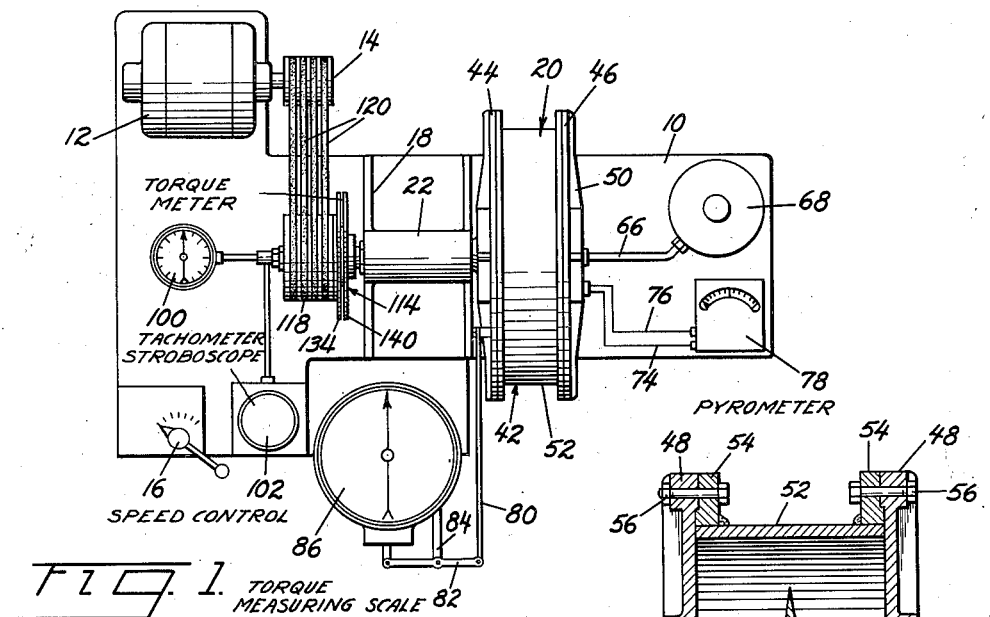
Fig. 1 is a top plan view of a testing apparatus embodying the invention.

Referring to the drawings for more specific details of the invention, 10 represents a base, preferably heavy, so that vibrations may be reduced to the minimum. The base has suitably mounted thereon an electrical variable speed motor 12 having on its armature shaft a group of pulleys 14. The motor is connected to a suitable source of electrical supply and to a control 16 mounted on the base 10, and a frame 18 mounted on the base 10 supports a test unit indicated generally at 20. As shown, the frame has a sleeve or journal box 22 arranged in parallel relation to the base 10, and fitted in the ends of the journal box are tapered roller bearings 24 and 26.

A hollow spindle 28 supported on the bearings 24 and 26 for slight angular or limited rotative movement has one end thereof a flange 30 abutting the inner race of the bearing 26, and a retaining ring 32 threaded on the spindle adjacent its other end abuts the inner race of the bearing 24 and serves to retain the spindle against displacement. The flange 30 has an axially disposed recess 34, and the wall defining this recess has concentrically disposed annular shoulders 36 and 38, the purpose of which will hereinafter appear, and the flange 30 also has a peripheral shoulder 40.

A demountable case 42 for the reception of liquid is mounted on the flange 30 of the spindle 28. The case includes corresponding discs 44 and 46 having heavy rims 48 and ribs 50 serving to effectively resist distortion of the discs due to dynamic pressures of the agitated fluid in the case. The discs are spaced apart by a heavy ring 52 having stout marginal flanges 54 interlocked with and secured to the rims 48 of the discs as by bolts 56. The discs have concentrically disposed hubs 58 and 60. The hub 58 is fitted on the shoulder 40 of the flange 30, and secured against displacement as by machine screws, and the hub 60 receives a closure plate 62 also secured against displacement as by machine screws.

The closure plate 62 has a concentrically disposed port 64 and a flexible tube 66 connected to this port providing communication between the case 42 and a combined reservoir and expansion tank 68. It is to be observed that the port 64 is axially disposed with relation to the case. This provides for control of pressure on the liquid at the axis of rotation of the case, and such control is essential because the liquid in the case necessarily heats up and changes volume during a normal testing operation. The closure plate 62 also has an opening 70 receiving a thermocouple 72 extended into the case and connected as by leads 74 and 76 to a temperature gauge 78 suitably supported on the base. This provides adequate means for measuring the temperature of the liquid in the case at all times.

A torque arm 80 connects the case 42 to one end of a walking beam 82 pivoted on a fixed support 84, and the other end of the walking beam is connected to an indicating scale 86 suitably supported on the base 10. The scale 86 measures the reaction torque caused by friction of the fluid on the walls of the case.

A shaft 88 has on one end thereof a splined spindle 90 and a collar 92 adjacent the spindle. A bearing 94 is fitted on the shaft in abutting relation to the collar, and a retaining nut 96 threaded on the shaft clamps the inner race of the bearing to the collar. The shaft 88 extends through the hollow spindle 28 and the bearing 94 thereon is received by the shoulder 36 in the recess 34 of the flange 30 on the hollow spindle, where it is held against displacement by a retaining ring 98 fitted on the shoulder 36 and secured to the flange 30 in abutting relation to the outer race of the bearing 94 and a suitable fluid seal is interposed between the retaining ring and the shaft. The spindle 90 on one end of the shaft 88 extends axially of the case 42, and the other end of the shaft 88 protrudes from the free end of the hollow spindle 28. An indicating tachometer 100 is suitably connected to the protruding end of the shaft for measuring speed of rotation of the shaft, and a stroboscope 102 is also connected to the shaft and synchronized therewith, the object of which will hereinafter appear.

The shaft 88 has splined thereto a sleeve 104 held against displacement as by a nut 106 threaded on the end of the shaft. The sleeve has an outwardly extended flange 108 having thereon a laterally extended flange 110 concentrically disposed to the sleeve 104, and fitted between the laterally extended flange 110 and the hollow spindle 28 is a bearing 112 for support of the shaft 88. The flange 108 has suitably secured thereto an element of a torque meter indicated generally at 114.

Spaced bearings 116 fitted on the sleeve 104 support for rotation a group of pulleys 118 connected as by belts 120 to the group of pulleys 14 on the armature shaft of the motor 12, and suitably secured to the pulleys 118 is another element of the torque meter 114.

The torque meter 114 includes spaced abutments 122 and 124 suitably secured to the flange 108 and extended coaxially within the pulleys 118 intermediate corresponding spaced abutments 128 and 130 on the interior of the pulleys 118, and arranged between the abutments on the flange 108 and the abutments on the pulleys 118 are compression springs 132 serving to yieldingly connect the pulleys 118 to the shaft 88 and to transmit driving force from the pulley to the shaft. A disc 134 suitably secured to the pulleys 118 has a marginal flange 136, and etched on the flange is a pointer 138. A similar disc 140 suitably secured to the flange 108 has a marginal flange 142 oppositely disposed with relation to the marginal flange 136 on the disc 134, and a scale 144 etched on the flange 142 cooperates with the pointer to give a visual indication of the driving torque readily readable through the medium of the stroboscope 102 synchronized with the shaft 88.

Figure 2:
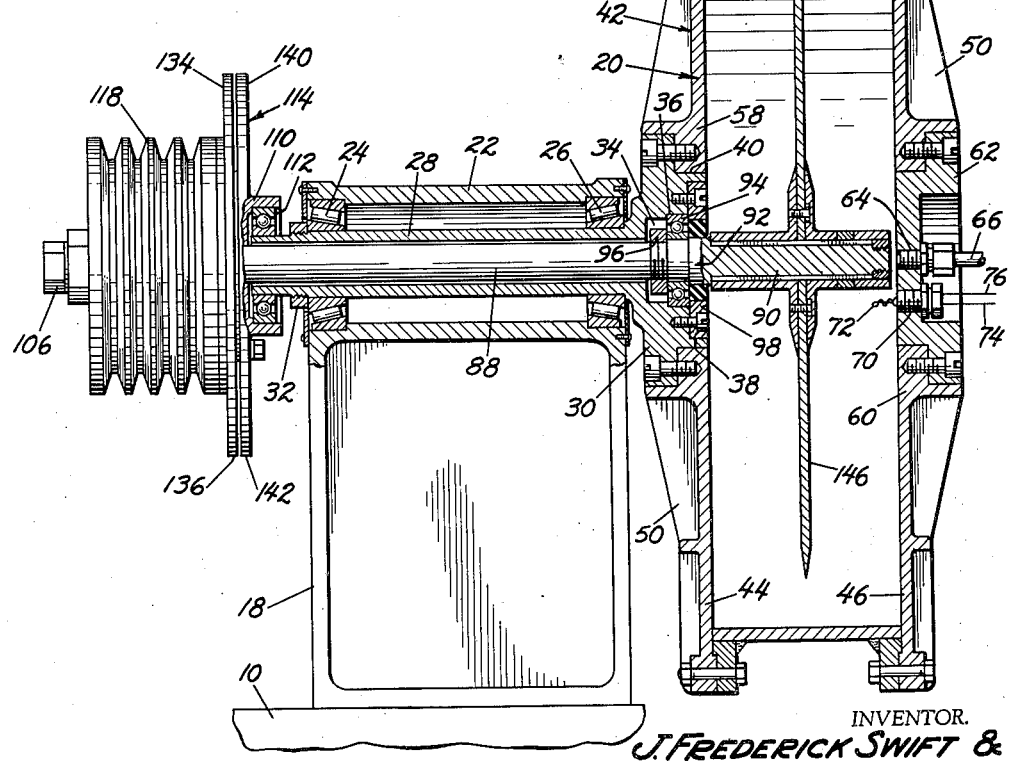
Fig. 2 is an enlarged longitudinal view, partly in section and partly in elevation, of the test unit.
Figure 3:
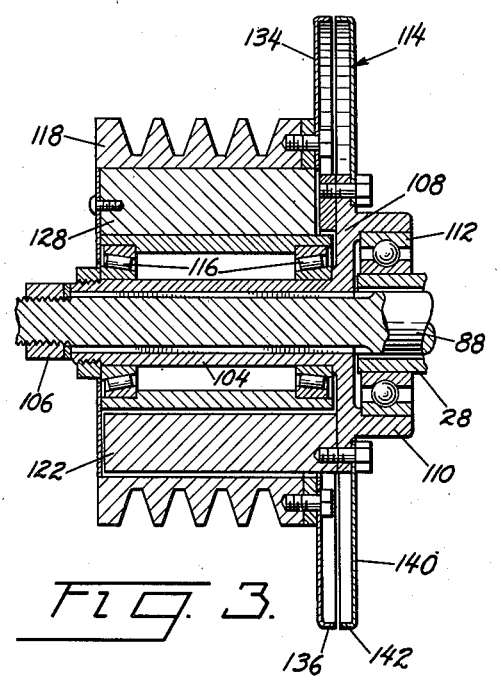
Fig. 3 is a vertical sectional view of the driving pulley and torque indicating means.
Figure 4:
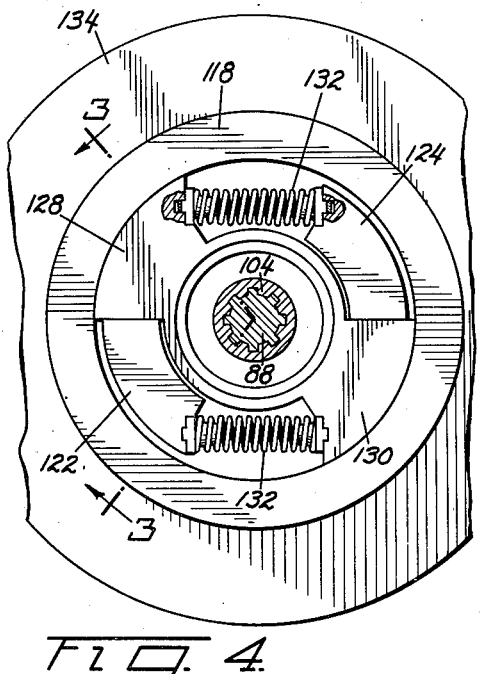
Fig. 4 is an end view of the pulley illustrating one of the sets of springs through which torque is transmitted from the pulley to the driving shaft.
Figure 7:
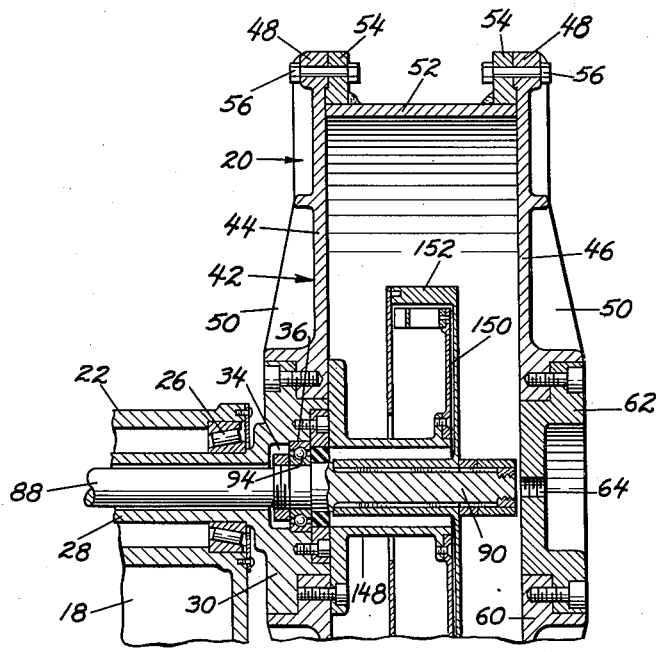
Fig. 7 is a similar view of the test unit set up to measure disc friction drag between a stationary reaction member and a rotating housing.

The apparatus is adaptable for conducting tests on various elements, and to that end special fixtures suitable for support of the element under test are fitted on the interior of the case 42 and on the spindle 90. As, for example, a disc 146, to undergo test, may be mounted on the spindle 90 and secured against displacement as by a retaining nut, as most clearly shown in Fig. 2; or a sleeve 148 affixed to the wall of the case may support a stationary reaction member 150 of a torque converter associated with a housing 152 supported on the spindle 90, as illustrated in Fig. 7; or the reverse of the latter test may be accomplished by mounting a drum 154 on the interior of the case and fixedly securing a reaction member 156 of a torque converter to the spindle.

Figure 6:
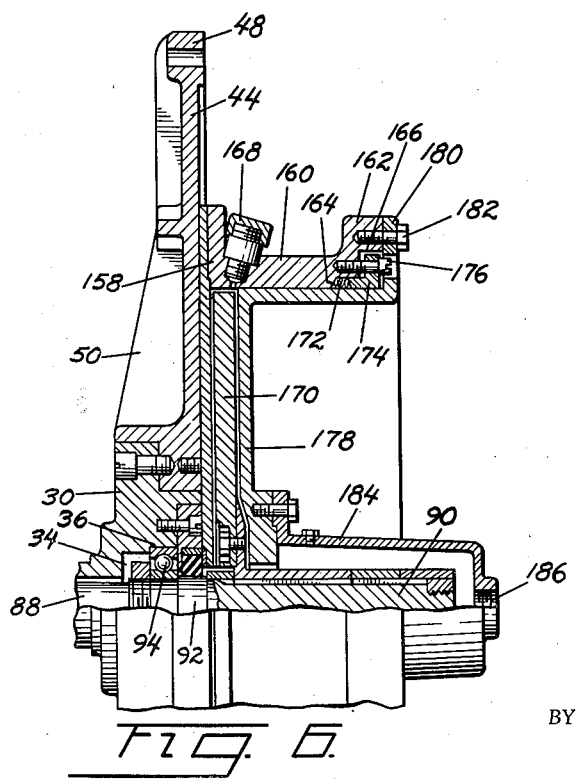
Fig. 6 is a fragmentary view, mostly in section, of the test unit set up to test effects of small clearances.
Figure 5:
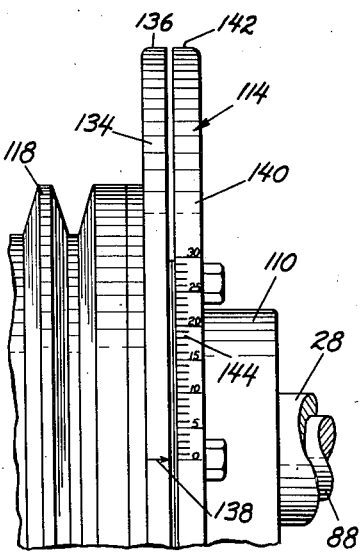
Fig. 5 is a fragmentary view of the pulley and associated torque transmitting means illustrating the scale.

It may be found desirable to conduct a test on an element to ascertain the effect of small clearances. In such instances, the case 42 is disassembled; however, the disc 44 of the case is left in position on the flange 30 of the spindle 28, and a drum 158 Fig. 6 is fixedly secured to the disc. The drum includes a heavy flange 160 having an outwardly extended marginal rim 162. The flange and rim are provided with internal shoulders 164 and 166, and a small opening through the rim has secured therein a bleeder screw 168.

An element indicated at 170 on which a test is to be conducted is mounted on the spindle 90 for rotation therewith adjacent the face of the drum 158 with the desired clearance between the element and the drum. A flexible sealing ring 172 is fitted on the shoulder 164, and a compression ring 174 bearing against the sealing ring is adjustably secured to the shoulder 166 as by screws 176.

A drum 178 telescopes the drum 158, and the drum 178 has a rim 180 secured to the rim 162 of the drum 158 as by spaced studs 182. The outer face of the drum 178 is spaced from the element 170 with small clearance, and suitably secured to the inner face of the drum 178 is a thimble 184 enclosing the spindle 90, and the thimble has an axial port 186 for the admission of fluid.

In a normal operation, assuming that the disc 146 is mounted on the spindle 90 of the drive shaft 88, and that the case 42 is filled with liquid to its capacity, upon energization of the motor 12, a driving force is transmitted from the armature shaft of the motor through the pulleys 14 and belts 20 to the pulleys 118. This results in driving the shaft 88 through the medium of the springs 132. The speed of rotation of the shaft 88 is indicated by the tachometer 100, and the torque developed due to resistance to rotation of the shaft is indicated by the torque meter 114 readily observed through the medium of the stroboscope 102 synchronized with the shaft 88.

Upon rotation of the disc 146, the fluid in the case 42 is set in motion, and this energy of the fluid imposes a drag on the case tending to turn the same. This force is transmitted from the case through the torque arm 80 and suitable linkage to the indicating scale 86 for measuring the torque required to resist rotation of the case due to drag on the walls thereof.

During rotation of the disc, the liquid in the case 42 becomes heated and expands, and to compensate for this condition the case is suitably connected to the combined reservoir and expansion tank 68. It is also desirable to know the temperature of the liquid during the various stages of operation of the apparatus, and to that end the thermo-couple 72 mounted in the case 42 is connected to the temperature gauge 78.

With these known controlled factors, the drag imposed on the disc when rotated in various types of liquid and at different speeds may be readily ascertained. In the test illustrated in Fig. 6, the disc 170 is mounted on the spindle 90 in an adjustable case providing for small clearance between the disc and the case. The test is conducted in an identical manner to that hereinabove described.

Figure 8:
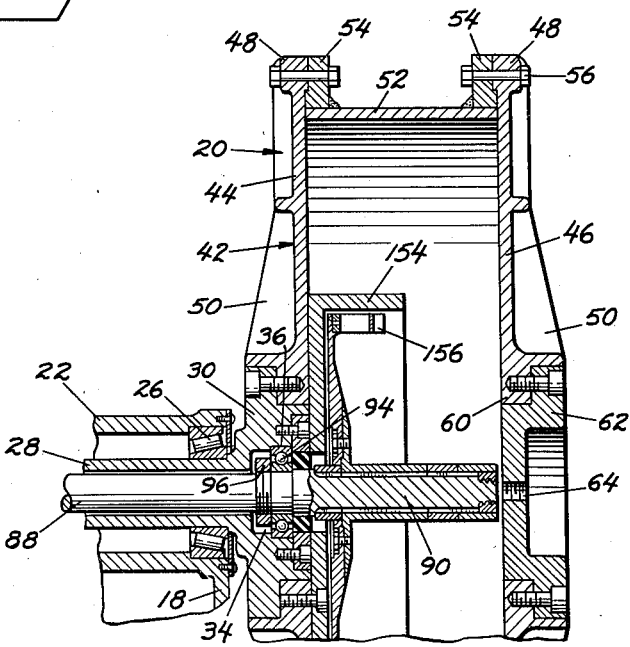
Fig. 8 is a similar view of the testing unit set up to measure disc friction drag between a rotating reaction member and a stationary housing.

In the test illustrated in Fig. 7, a stationary reaction member 150 of a torque converter is supported on a fixture 148 secured to the inner wall of the case, and a housing 152 for the reaction member having demountable blades of conventional type is mounted on the spindle 90 for rotation therewith. In conducting this test, it is necessary to first run the test with the blades of the reaction member removed, and then replace the blades on the reaction member, and repeat the test. The net drag of the reaction member on the housing 152 is the difference between the two runs. The test illustrated in Fig. 8 is conducted in a similar manner.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what we claim as new and desire to secure by Letters Patent is:

1. A testing apparatus for determining frictional resistance imposed on a mass when rotated in liquid comprising a support, a hollow shaft mounted for limited rotative movement thereon, a case for the reception of liquid fixedly secured to the hollow shaft, a reaction torque measuring instrument connected to the case, a shaft mounted for rotation in the hollow shaft, a speed indicating instrument connected to the shaft, a spindle on the shaft extended into the case for support of an element to undergo test, a torque measuring device connected between the shaft and the hollow shaft, and means for driving the shaft through the torque measuring device including means for regulating the speed of rotation of the shaft.

2. A testing apparatus for determining frictional resistance imposed on a mass when rotated in liquid comprising a support, a case mounted on the support for limited rotative movement, a rotatable spindle in the case for support of an element to undergo test, a speed indicating instrument connected to the spindle, a torque measuring device connected between the spindle and the case, power transmitting means for driving the spindle through the torque measuring device, and a reaction torque measuring instrument connected to the case, the measurements indicated by the various instruments during a test operation being correlative to determine the frictional resistance imposed on the mass.

3. A testing apparatus for determining frictional resistance imposed on a mass when rotated in liquid comprising a support, a case mounted on the support for the reception of liquid having limited rotative movement, a liquid reservoir connected to the case, a thermo-couple mounted in the case and connected to a gauge for indicating the temperature of the liquid, a reaction torque measuring instrument connected to the case for indicating reaction torque thereof, a spindle mounted for rotation in the case for support of an element to undergo test, a torque measuring device connected between the case and the spindle for indicating the torque imposed on the element by the liquid, and means for driving the spindle through the torque measuring device, the measurements indicated by the various instruments during a test operation being correlative to determine the frictional resistance imposed on the mass.

4. A testing apparatus for determining frictional resistance imposed on a mass when rotated in liquid comprising a support, a case mounted for limited rotative movement on the support adapted to contain liquid, a reservoir for supplying the case, a thermo-couple in the case, a gauge connected to the thermo-couple for indicating the temperature of the liquid, a spindle mounted for rotation in the case for support of an element to be tested, a torque measuring device connected between the spindle and the case for indicating the torque imposed on the element by the liquid, a reaction torque measuring means connected to the case for measuring the torque imposed on the case by the liquid, a tachometer connected to the spindle for indicating the speed thereof, and means for driving the spindle through the torque measuring device, the measurements indicated by the various instruments during a test operation being correlative to determine the frictional resistance imposed on the mass.

JOHN FREDERICK SWIFT.
RAYMOND J. MILLER.